United States Patent [19]

Umemoto et al.

[11] Patent Number: 4,496,838

[45] Date of Patent: Jan. 29, 1985

[54] NOISE ERASING APPARATUS FOR STIMULABLE PHOSPHOR SHEET

[75] Inventors: Chiyuki Umemoto; Kazuo Kohketsu, both of Kanagawa, Japan

[73] Assignee: Fuji Photo Film Co., Ltd., Tokyo, Japan

[21] Appl. No.: 441,983

[22] Filed: Nov. 15, 1982

[30] Foreign Application Priority Data

Nov. 13, 1981 [JP] Japan .................. 56-181832

[51] Int. Cl.³ ............................................. G03C 5/16
[52] U.S. Cl. ................................................ 250/327.2
[58] Field of Search .................. 250/327.2, 484.1; 378/173

[56] References Cited

U.S. PATENT DOCUMENTS

| | | | |
|---|---|---|---|
| 2,468,452 | 4/1949 | Leverenz | 358/242 |
| 4,236,078 | 11/1980 | Kotera et al. | 250/327.2 |
| 4,239,968 | 12/1980 | Kotera et al. | 250/327.2 |
| 4,245,835 | 1/1981 | Turner | 271/226 |
| 4,253,028 | 2/1981 | De Bruin et al. | 378/173 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida | 364/414 |
| 4,394,581 | 7/1983 | Takahashi | 250/484.1 |
| 4,400,619 | 8/1983 | Kotera et al. | 250/327.2 |

Primary Examiner—Janice A. Howell
Assistant Examiner—Constantine Hannaher
Attorney, Agent, or Firm—Sughrue, Mion, Zinn, Macpeak, and Seas

[57] ABSTRACT

An apparatus for erasing noise in a stimulable phosphor sheet used for a radiation image recording and reproducing system in which a radiation image is once recorded on the phosphor sheet and then read out and reproduced to a visible image. The apparatus comprises an erasing light source emitting light having a wavelength within the range of 400 nm to 600 nm, a loader for carrying the phosphor sheet into the apparatus, a holder for holding the phosphor sheet in the position facing the erasing light source, and an unloader for carrying the phosphor sheet out of the position facing the erasing light source. The erasing light source may be a fluorescent lamp, a laser source, an Na lamp, an Ne lamp, a metal halide lamp or an Xe lamp. It preferably comprises many aperture type white fluorescent lamps positioned in parallel with one another along an oblique plane, and the phosphor sheet is moved up therealong.

15 Claims, 4 Drawing Figures

NOISE ERASING APPARATUS FOR STIMULABLE PHOSPHOR SHEET

BACKGROUND OF THE INVENTION

1. Field of the Invention

This invention relates to an apparatus for effectively erasing noise developing in a visible image reproduced from a stimulable phosphor sheet carrying a radiation image stored thereon. This invention particularly relates to an apparatus for effectively erasing noise developing in such a reproduced visible image due to repeated use of the stimulable phosphor sheet in a radiation image information recording and reproducing method wherein the stimulable phosphor sheet is exposed to a radiation to record a radiation image therein and then exposed to a stimulating ray to emit light in the pattern of the stored image, the emitted light is converted to an electric signal, and a visible image corresponding to the radiation image is reproduced by use of the electric signal.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to a stimulating ray such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,315,318 and 4,276,473, U.S. patent application Ser. No. 220,780 and Japanese Unexamined patent publication No. 56(1981)-11395, it has been proposed to use the stimulable phosphor for recording a radiation image of an object for medical diagnosis or the like. Specifically, the stimulable phosphor is first exposed to a radiation to have a radiation image stored therein, and is then scanned with a stimulating ray which causes it to emit light in the pattern of the stored image. The light emitted from the stimulable phosphor upon stimulation thereof is photoelectrically detected and converted to an electric image signal, which is processed as desired to reproduce a visible image of a quality suitable for viewing and diagnostic purposes. In this method, in order to make the wavelength distribution of the stimulating ray different from and far apart from the wavelength distribution of the light emitted from the stimulable phosphor and effectively detect the very weak light emitted therefrom, it is preferred to detect light having a wavelength within the range of 300nm to 500nm emitted from the stimulable phosphor upon stimulation thereof by use of a stimulating ray having a wavelength within the range of 600nm to 700nm. For this purpose, it is desired to employ a stimulable phosphor capable of emitting light having a wavelength within the range of 300nm to 500nm upon stimulation thereof by a stimulating ray having a wavelength within the range of 600nm to 700nm, as described in U.S. Pat. No. 4,258,264.

In the radiation image recording and reproducing method described above, the final visible image may be reproduced in the form of a hard copy or may be displayed on a cathode ray tube. The stimulable phosphor sheet used in this method may be in any of various forms such as a panel, drum or the like, which are herein generally referred to as sheets. For economical reasons, it is desirable that the stimulable phosphor sheet be used repeatedly in many separate radiographic operations.

In order to reuse the stimulable phosphor sheet, it is necessary that the stimulable phosphor sheet to be reused be made completely free from the previously stored radiation image. Theoretically, the radiation energy of the radiation image stored in the stimulable phosphor sheet should disappear when the sheet is scanned with a stimulating ray of a sufficient intensity to cause light to emit therefrom in the pattern of the stored radiation image in the course of the radiation image recording and reproducing process as described above. Actually, however, the stored radiation energy cannot be completely eliminated only with the stimulating ray used to scan the stimulable phosphor sheet during the aforesaid process. Thus a part of the previously stored radiation image remains in the reused stimulable phosphor sheet and inconveniently causes noise to occur in the visible image reproduced from the reused stimulable phosphor sheet. In order to successfully reuse the stimulable phosphor sheet, any such residual radiation image thereon must be erased completely before reuse.

Further, a stimulable phosphor contains a trace of radioactive isotopes such as $^{226}$Ra and $^{40}$K, which emit radiations and cause the stimulable phosphor sheet to store the emitted radiation energy even when the sheet is not being used in radiography. These traces of radioactive isotopes also constitute a cause of the noise developing in the reproduced visible radiation image. Furthermore, a stimulable phosphor sheet is also affected by environmental radiations such as cosmic rays and X-rays emitted from other X-ray sources and stores the energy thereof. These types of radiation energy (hereinafter referred to as fog) undesirably stored in the stimulable phosphor sheet also cause noise to appear in the visible radiation image reproduced from a reused stimulable phosphor sheet and, therefore, must be erased before reusing the stimulable phosphor sheet.

In order to avoid noise occurring in the reproduced visible image due to the noise originating from the radiation image previously stored in a stimulable phosphor sheet and due to the fog developing during the storage of the sheet, the Applicant has proposed in his Japanese Unexamined patent publication No. 56(1981)-11392 to stimulate the stimulable phosphor sheet by use of light of wavelengths including the wavelength range of the stimulating ray for the phosphor before storing a radiation image in the stimulable phosphor sheet, thereby to discharge the detrimental radiation energy therefrom to an acceptable extent.

In the above-mentioned noise erasing method, a stimulating ray having a wavelength within the range between visible light and infrared regions is employed, and the light source used for noise erasing is a tungsten-filament, halogen, or infrared lamp emitting light within the range between visible light and infrared rays.

However, it was found that, when the light source described above is used to erase noise on the stimulable phosphor sheet, heat waves such as infrared rays are emitted from the erasing light source to the stimulable phosphor sheet, and consequently, the temperature of the stimulable phosphor sheet rises during noise erasing, resulting in deterioration of the binder contained in the stimulable phosphor sheet for binding the stimulable phosphor. Thus, as the stimulable phosphor sheet is used repeatedly for recording radiation images thereon and erasing is conducted repeatedly thereon, a part of the stimulable phosphor peels from the sheet. This problem is aggravated particularly when the temperature of the stimulable phosphor sheet rises to 60° C. or more.

One solution to the above-mentioned problem is to position the erasing light source far from the stimulable phosphor sheet in order to reduce heat applied from the erasing light source to the stimulable phosphor sheet, and use a large-scale cooling apparatus. In this case, however, the size of the erasing apparatus becomes large, necessitating a large space for installing it. Further, since the erasing light source is spaced far away from the stimulable phosphor sheet, loss of the illuminance applied to the phosphor sheet increases, and it becomes necessary to use an erasing light source having higher power. Consequently, power consumption of the erasing apparatus increases greatly. Furthermore, this method is uneconomical since the power is wasted for the purposes other than the emission of the stimulating ray effective for erasing.

SUMMARY OF THE INVENTION

The primary object of the present invention is to provide a noise erasing apparatus capable of effectively and economically erasing noise in a radiation image recording and reproducing method using a stimulable phosphor.

Another object of the present invention is to provide a noise erasing apparatus capable of effectively erasing noise with low power without having the temperature of the stimulable phosphor sheet rise in the absence of a large-scale cooling apparatus.

The specific object of the present invention is to provide a noise erasing apparatus which is small in size and capable of being installed in a small space.

Various experiments conducted on the stimulable phosphor sheet, which emits light having a wavelength within the range of 300nm to 500nm upon stimulation thereof by a stimulating ray having a wavelength within the range of 600nm to 700nm and which are preferably used in the radiation image recording and reproducing system described above, for the purpose of accomplishing the above objects revealed that noise erasing can be achieved most effectively when light having a wavelength within the range of 400nm to 600nm is employed for erasing noise.

Accordingly, the present invention provides a noise erasing apparatus for a stimulable phosphor sheet, which comprises an erasing light source emitting light mainly having a wavelength within the range of 400nm to 600nm, a loading means for carrying the stimulable phosphor sheet to the position facing said erasing light source, a holding means for holding said stimulable phosphor sheet in the position facing said erasing light source, and an unloading means for carrying said stimulable phosphor sheet out of the position facing said erasing light source.

The aforesaid observation that noise erasing is achieved most effectively by use of light having a wavelength within the range of 400nm to 600nm is very surprising because the stimulable phosphor sheet having the aforesaid properties emits light most effectively when it is exposed to light having a wavelength within the range of 600nm to 700nm and, therefore, experts in the art will consider that it will be most effective to conduct noise erasing by use of light having wavelength within the range of 600nm to 700nm.

FIG. 1 shows erasing characteristics of radiation energy stored in the BaFX:Eu (X=Cl or Br) stimulable phosphor. The erasing efficiency shown in FIG. 1 was obtained by normalizing the reciprocals of the noise levels determined by exposing the BaFX:Eu (X=Cl or Br) stimulable phosphor to X-rays emitted from an X-ray tube at a tube voltage of 40kVp and a tube current of 10mA for 30 seconds, exposing the phosphor to a 633nm laser beam, exposing the phosphor to erasing light by maintaining the irradiating energy constant and changing the wavelength within the range of 350nm to 700nm, again exposing the phosphor to a 633 nm laser beam, detecting the light emitted from the phosphor by use of a photodetector, and then determining the levels of radiation energy remaining in the phosphor after erasing. FIG. 1 clearly shows that noise erasing is achieved most effectively when light having a wavelength within the range of 400nm to 600nm is employed for erasing noise.

The erasing characteristics of the BaFX:Eu (X=Cl or Br) stimulable phosphor as shown in FIG. 1 are approximately common to all kinds of stimulable phosphors that emit light having a wavelength within the range of 300nm to 500nm at the highest light emission efficiency when stimulated with light having a wavelength within the range of 600nm to 700nm.

In the present invention, the erasing efficiency is greatly improved by conducting erasing by use of light having a wavelength within the range of 400nm to 600nm. Further, since light of long wavelength region is not used for erasing, the temperature of the stimulable phosphor sheet does not rise during erasing, and it is possible to position the erasing light source near to the stimulable phosphor sheet. Accordingly, it becomes possible to obtain a high illuminance with low electric power, and further improve the erasing efficiency. Further, the size of the erasing apparatus can be minimized, and it is not necessary to use a large-scale cooling apparatus.

As the stimulable phosphor capable of emitting light having a wavelength within the range of 300nm to 500nm upon stimulation thereof by a stimulating ray having a wavelength within the range of 600nm to 700nm, for example, rare earth element activated alkaline earth metal fluorohalide phosphor is preferred. One example of this phosphor is, as shown in U.S. patent application Ser. No. 57,080 (Japanese Unexamined patent publication No. 55(1980)-12143), a phosphor represented by the formula $(Ba_{1-x-y}, Mg_x, Ca_y)FX: aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x}, M^{II}_x) FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor can be used ZnS:Cu,Pb; $BaO.xAl_2O_3$:Eu wherein $0.8 \leq x \leq 10$; and $M^{II}O.xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth element activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined patent publication Nos. 56(1981)-2385 and 56(1981)-2386, or barium fluorohalide phosphors added with at least one of a metal chloride, a metal bromide and a metal iodide as disclosed in U.S. patent application Ser. No. 367,665 (European patent publication No. 29,963) are also preferable because of their improved light emitting characteristics.

The apparatus of this invention is particularly useful for erasing a noise of the stimulable phosphor sheet containing a stimulable phosphor of barium fluorohalide series or layer earth metal oxyhalide series.

It is also desirable to color the phosphor layer of the stimulable phosphor sheet made of the above phosphor by use of pigments or dyes to improve the sharpness of the image obtained thereby as disclosed in U.S. patent application Ser. No. 156,520 (European patent publication No. 21,174).

As the erasing light source in the present invention, any light sources may be employed in combination with a filter for cutting off light having a wavelength beyond the range of 400nm to 600nm, insofar as they emit light having a wavelength within the range of 400nm to 600nm. For example, it is possible to employ a white fluorescent lamp, a laser source, a sodium lamp, a neon lamp, a metal halide lamp, a xenon lamp or the like. Among them, the white fluorescent lamp is preferable since it exhibits the spectral characteristics as shown in FIG. 2 and can be used as the erasing light source in the present invention without using the filter. Further, the fluorescent lamp exhibits high brightness with respect to power consumption and, therefore, it can effectively erase noise with low power consumption. The aperture type white fluorescent lamp provided with a reflection layer at the section other than the slit-like transmitting section is further preferable since it exhibits very high brightness with lower power.

DESCRIPTION OF THE PREFERRED EMBODIMENTS

The present invention will hereinbelow be described in further detail with reference to the accompanying drawings.

Figure 1:
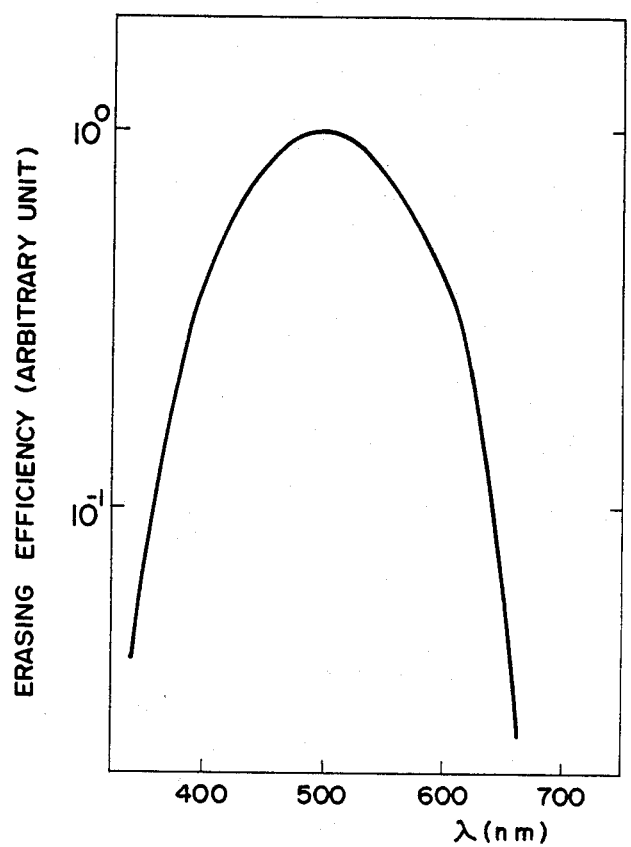
FIG. 1 is a graph showing the erasing characteristics of radiation energy stored in a stimulable phosphor.
Figure 2:
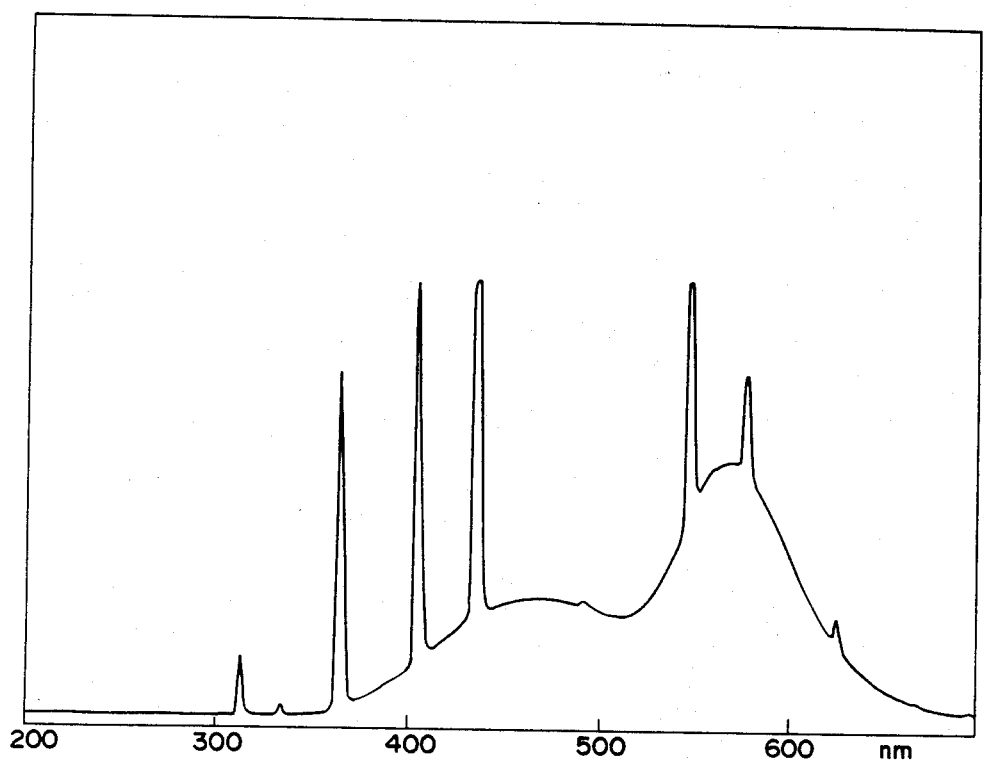
FIG. 2 is a graph showing the spectral characteristics of a white fluorescent lamp.
Figure 3:
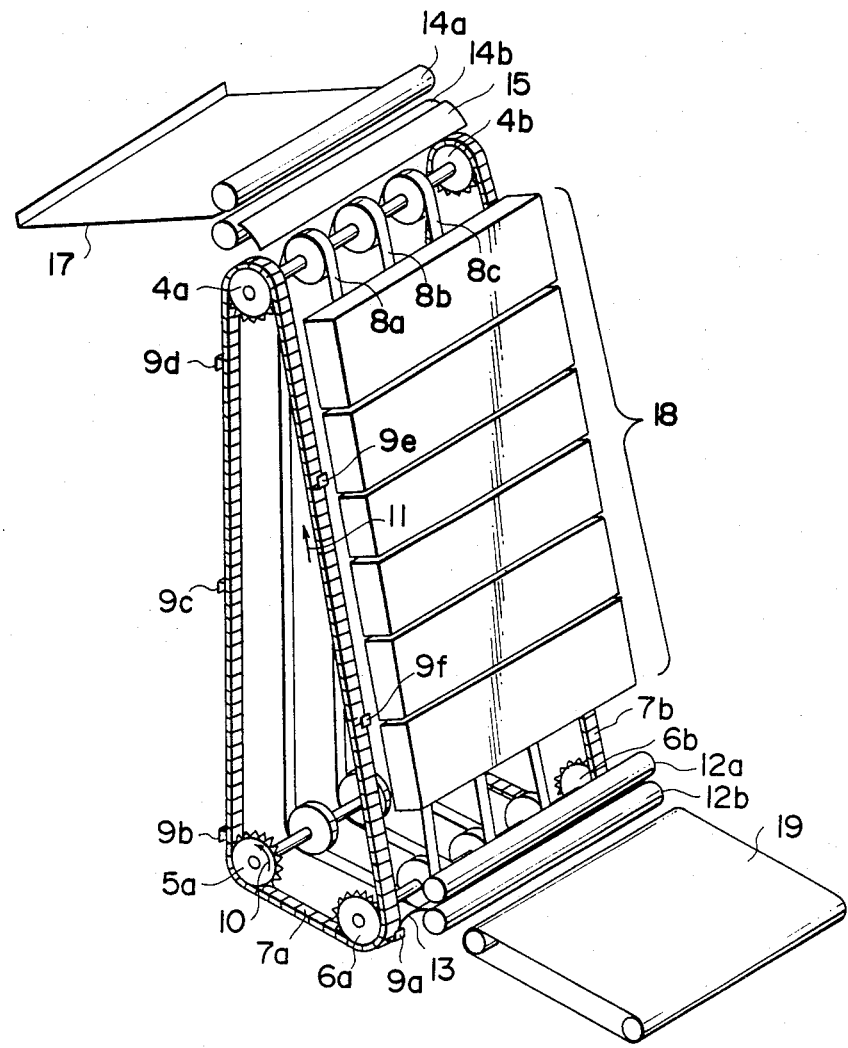
FIG. 3 is a schematic perspective view showing an embodiment of the noise erasing apparatus in accordance with the present invention.
Figure 4:
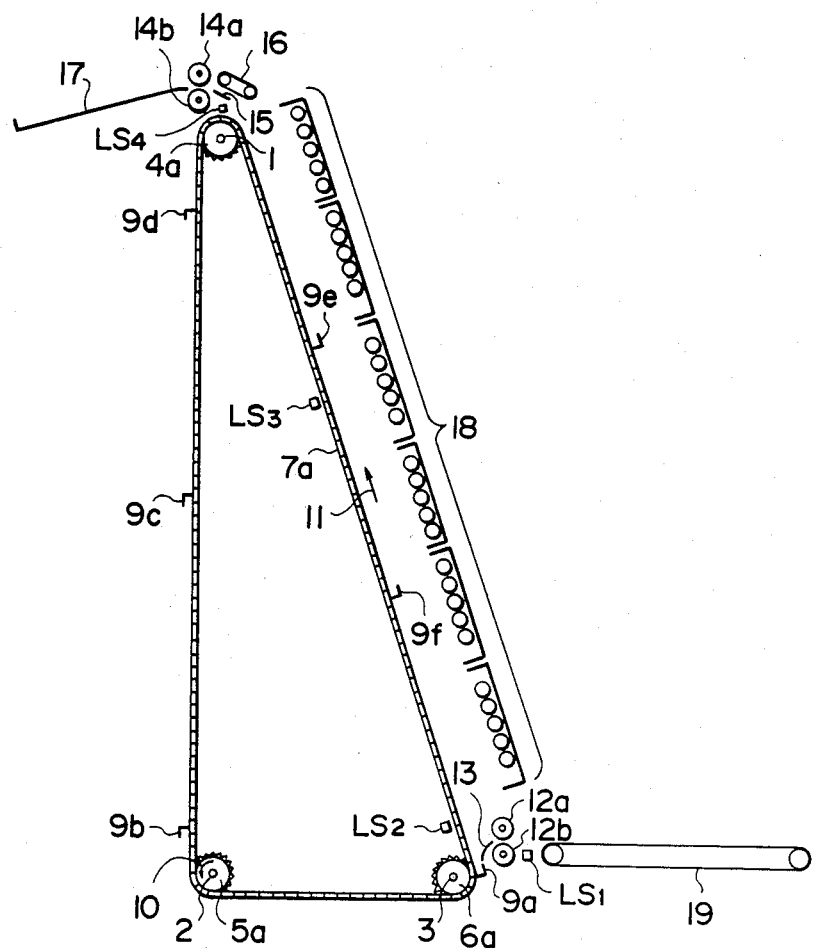
FIG. 4 is a side view of the embodiment shown in FIG. 3.

Referring to FIGS. 3 and 4, sprockets $4a$ and $4b$, $5a$ and $5b$, $6a$ and $6b$ are secured to both ends of shafts 1, 2 and 3, respectively, to rotate chains $7a$ and $7b$ applied around these sprockets. At the intermediate sections of the shafts 1, 2 and 3, respectively, are secured three pulleys engaging with belts $8a$, $8b$ and $8c$. The portions of the chains $7a$ and $7b$ and the belts $8a$, $8b$ and $8c$ are inclined leftwards so as to support stimulable phosphor sheets thereupon. The chains $7a$ and $7b$ are provided with claws $9a$, $9b$, $9c$, $9d$, $9e$ and $9f$ positioned at intervals larger than the length of the stimulable phosphor sheet in the vertical direction for the purpose of holding and carrying the phosphor sheet. The chains $7a$ and $7b$, belts $8a$, $8b$ and $8c$ are moved in the direction of the arrow 11 when the shaft 2 is rotated in the direction of the arrow 10 by a drive unit (not shown) positioned at the shaft 2. At the lower section of the apparatus are positioned nip rollers $12a$ and $12b$ for loading the stimulable phosphor sheets into the apparatus. A guide plate 13 for making the phosphor sheet certainly held by the claws $9a$, $9b$, $9c$, $9d$, $9e$ and $9f$ of the chains $7a$ and $7b$ after the phosphor sheets are carried into the apparatus by the nip rollers $12a$ and $12b$ are positioned between the nip rollers $12a$, $12b$ and the chains $7a$, $7b$, belts $8a$, $8b$, $8c$. At the upper section of the apparatus are positioned nip rollers $14a$ and $14b$ for unloading the phosphor sheets carried to the nip rollers $14a$ and $14b$ by the chains $7a$ and $7b$. A guide plate 15 and a guide belt 16 for making the phosphor sheets certainly carried out by the nip rollers $14a$ and $14b$ after the phosphor sheets are carried to the upper section of the apparatus are positioned between the nip rollers $14a$, $14b$ and the chains $7a$, $7b$, belts $8a$, $8b$, $8c$. A receiving plate 17 for receiving the unloaded phosphor sheets is positioned on the side of the nip rollers $14a$ and $14b$ opposite to the guide plate 15. An erasing light source 18 is opposed to the plane formed by the chains $7a$ and $7b$ and the belts $8a$, $8b$ and $8c$ between the shafts 1 and 3. The erasing light source 18 comprises six units each consisting of five aperture type white fluorescent lamps. This unit configuration of the erasing light source 18 is suitable for facilitating maintenance thereof. The apparatus is further provided with position detecting switches LS1, LS2, LS3 and LS4 for detecting the positions of the phosphor sheets, and a conveyor belt 19 for carrying the phosphor sheets up to the nip rollers $12a$ and $12b$.

In the embodiment described above, since the aperture type white fluorescent lamp emitting less heat is employed as the erasing light source, it is possible to position the phosphor sheets near to the erasing light source. Further, since the phosphor sheets are carried up in the erasing apparatus during the erasing operation, the erasing apparatus can be installed in a very small area.

The apparatus shown in FIGS. 3 and 4 are operated as described below.

The first stimulable phosphor sheet sent from the radiation image read-out step is carried by the conveyor belt 19 until the forward end of the first phosphor sheet reaches the position just prior to the nip rollers $12a$ and $12b$. When the position detecting switch LS1 detects the phosphor sheet, the nip rollers $12a$ and $12b$ are rotated to carry the phosphor sheet into the erasing apparatus. When completely loaded into the apparatus by the nip rollers $12a$ and $12b$, the phosphor sheet is held by the claws $9a$ of the chains $7a$ and $7b$ by being guided by the guide plate 13, and erasing with the erasing light source 18 is started. In synchronization with the completion of the loading, the nip rollers $12a$ and $12b$ are stopped, and the shaft 2 is rotated in the direction of the arrow 10 to rotate the chains $7a$, $7b$ and belts $8a$, $8b$, $8c$ in the direction of the arrow 11. When the first phosphor sheet is moved up in this way and the tail end thereof is detected by the position detecting switch LS2, the chains $7a$, $7b$ and the belts $8a$, $8b$, $8c$ are stopped. When the second phosphor sheet sent from the radiation image read-out step is carried to the position just prior to the nip rollers $12a$ and $12b$ in the same way as described above and detected by the position detecting switch LS1, the second phosphor sheet is loaded into the erasing apparatus as described above. The second phosphor sheet is then held by the claws 9b of the chains 7a and 7b and carried until the tail end thereof reaches the position detecting switch LS2, while the first phosphor sheet is carried by the chains 7a, 7b and the belts 8a, 8b, 8c until the forward end thereof reaches the position detecting switch LS3. At this time, the chains 7a, 7b and the belts 8a, 8b, 8c are again stopped. When the third phosphor sheet is detected by the position detecting switch LS1, it is loaded into the erasing apparatus in the same way as described above, and the first phosphor sheet is carried by the chains 7a, 7b and the belts 8a, 8b, 8c until the forward end thereof reaches the position detecting switch LS4. During this operation, the second phosphor sheet is carried until the forward end thereof reaches the position detecting switch LS3. At this time, the chains 7a, 7b and the belts 8a, 8b, 8c are stopped, and the tail end of the third phosphor sheet is positioned at the position detecting switch LS2. When the forward end of the first phosphor sheet is detected by the position detecting switch LS4, the guide belt 16 and the nip rollers 14a, 14b are rotated to unload the first phosphor sheet onto the receiving plate 17. In the same way as described above, when the fourth and fifth phosphor sheets are detected by the position detecting switch LS1 and loaded into the erasing apparatus, the second and third phosphor sheets are sequentially unloaded therefrom.

In the embodiment described above, in order to prevent the apparatus from jamming with the phosphor sheets, the speeds of the nip rollers 12a, 12b, 14a, 14b, the conveyor belt 19, and the guide belt 16 should be higher than the carrying speed of the chains 7a, 7b and the belts 8a, 8b, 8c.

In the embodiment described above, since noise erasing is conducted while the phosphor sheets are carried in the apparatus, it is possible to uniformly erase noise.

It should be understood that the present invention can be embodied in various ways other than the above described embodiment. For example, erasing may be conducted by horizontally carrying the phosphor sheets. Further, the erasing light source may be white fluorescent lamps of the type other than the aperture type. It is also possible to employ an erasing light source other than the white fluorescent lamps. In this case, if the intensity of light having a wavelength beyond the range of 400nm to 600nm is high, it is possible to use a filter for cutting off light having a wavelength beyond the range of 400nm to 600nm. Further, instead of moving the phosphor sheets near the erasing light source, the phosphor sheets may be maintained stationary and exposed to noise erasing light in this condition. Further, the means for loading the phosphor sheets into the apparatus and unloading them therefrom may be constructed by a single mechanism.

We claim:

1. A noise erasing apparatus for a stimulable phosphor sheet, which comprises an erasing light source emitting light mainly having a wavelength within the range of 400nm to 600nm, a loading means for carrying the stimulable phosphor sheet to the position facing said erasing light source, a holding means for holding said stimulable phosphor sheet in the position facing said erasing light source, and an unloading means for carrying said stimulable phosphor sheet out of the position facing said erasing light source.

2. An apparatus as defined in claim 1 wherein said erasing light source is provided with a filter for cutting off light having a wavelength beyond the range of 400nm to 600nm.

3. An apparatus as defined in claim 1 wherein said erasing light source consists of a fluorescent lamp, a laser source, an Na lamp, an Ne lamp, a metal halide lamp or an Xe lamp.

4. An apparatus as defined in claim 3 wherein said fluorescent lamp is a white fluorescent lamp.

5. An apparatus as defined in claim 4 wherein said white fluorescent lamp is an aperture type white fluorescent lamp.

6. An apparatus as defined in claim 1 wherein said erasing light source comprises a plurality of aperture type white fluorescent lamps positioned in parallel with one another, and said holding means has a function of holding said stimulable phosphor sheet in the position facing a plurality of said aperture type white fluorescent lamps and carrying said stimulable phosphor sheet in the direction of parallel arrangement of said aperture type white fluorescent lamps.

7. An apparatus as defined in claim 6 wherein said aperture type fluorescent lamps are positioned in parallel with one another along an oblique plane, and said holding means carries said stimulable phosphor sheet upwards along said oblique plane.

8. An apparatus as defined in claim 6 or 7 wherein said holding means comprises chains and belts for holding said stimulable phosphor sheet.

9. An apparatus as defined in claim 8 wherein said chains are provided with claws positioned at intervals larger than the vertical length of said stimulable phosphor sheet for the purpose of holding said stimulable phosphor sheet.

10. An apparatus as defined in claim 1 wherein said loading means comprises nip rollers.

11. An apparatus as defined in claim 1 wherein said unloading means comprises nip rollers.

12. An apparatus as defined in claim 1 further comprising position detecting switches for detecting the position of said stimulable phosphor sheet and timing the operations of said erasing light source, said loading means, said holding means and said unloading means.

13. An apparatus as defined in claim 1 wherein said stimulable phosphor sheet has the property of emitting light having a wavelength within the range of 300nm to 500nm at the highest light emission efficiency when stimulated with light having a wavelength within the range of 600nm to 700nm.

14. An apparatus as defined in claim 1 wherein said stimulable phosphor sheet is made of at least one of stimulable phosphors selected from the group consisting of:

(i) rare earth metal element activated alkaline earth metal fluorohalide phosphor;

(ii) Zns:Cu,Pb;

(iii) $BaO \cdot xAl_2O_3:Eu$ ($0.8 \leq x \leq 10$);

(iv) $M^{II}O \cdot xSiO_2:A$ (wherein $M^{II}$ is Mg, Ca, Sr, Zn, Cd or Ba, A is Ce, Tb, Eu, Tm, Pb, Tl, Bi, or Mn, and $0.5 < x > 2.5$).

(v) $LnOX:xA$ (wherein Ln is at lest one of La, Y, Gd and Lu, X is at least one of Cl and Br, A is at least one of Ce and Tb, and $0 < x 0.1$).

15. An apparatus as defined in claim 14 wherein said stimulable phosphor sheet is made of rare earth metal element activated alkaline earth metal fluorohalide phosphor.

* * * * *